United States Patent [19]

Schüller et al.

[11] 3,767,848

[45] Oct. 23, 1973

[54] POSITIVELY GUIDED DISC RECORD PICKUP

[75] Inventors: Eduard Schüller, Wedel; Gerhard Dickopp, Wolfgang Rainer, Horst Redlich, Hans-Joachim Klemp, all of Berlin, Germany

[73] Assignees: Licentia Patent-Verwaltungs-GmbH, Frankfurt; Teldec-Telefunken-Decca Schallplatten GmbH, Hamburg, both of Germany

[22] Filed: June 18, 1971

[21] Appl. No.: 154,545

[30] Foreign Application Priority Data

June 18, 1970 Germany .................. P 20 29 909.6

[52] U.S. Cl. ....... 178/6.6 R, 179/100.4 R, 274/4 H, 274/13 R, 274/14, 274/23 A

[51] Int. Cl. ....... G11b 3/22, G11b 3/38, H04n 5/76

[58] Field of Search ............................ 179/100.4 R; 274/4 H, 13 R, 14, 23 A; 178/6.6 R, 6.7 R

[56] References Cited

UNITED STATES PATENTS

| | | | |
|---|---|---|---|
| 3,572,724 | 3/1971 | Rabinow | 274/23 A |
| 2,325,708 | 8/1943 | Runge | 274/14 |
| 2,446,526 | 10/1948 | Chanal | 274/13 R |
| 2,323,257 | 6/1943 | Thompson | 274/14 |

*Primary Examiner*—Howard W. Britton
*Attorney*—Spencer & Kaye

[57] ABSTRACT

A mechanism for playing back television pictures recorded on picture record discs including, a pickup for the video signals which are moved radially across the disc by means of a positively guided mount in which the pickup is elastically mounted. The guide means for the mount are rigidly coupled with the turntable drive.

23 Claims, 7 Drawing Figures

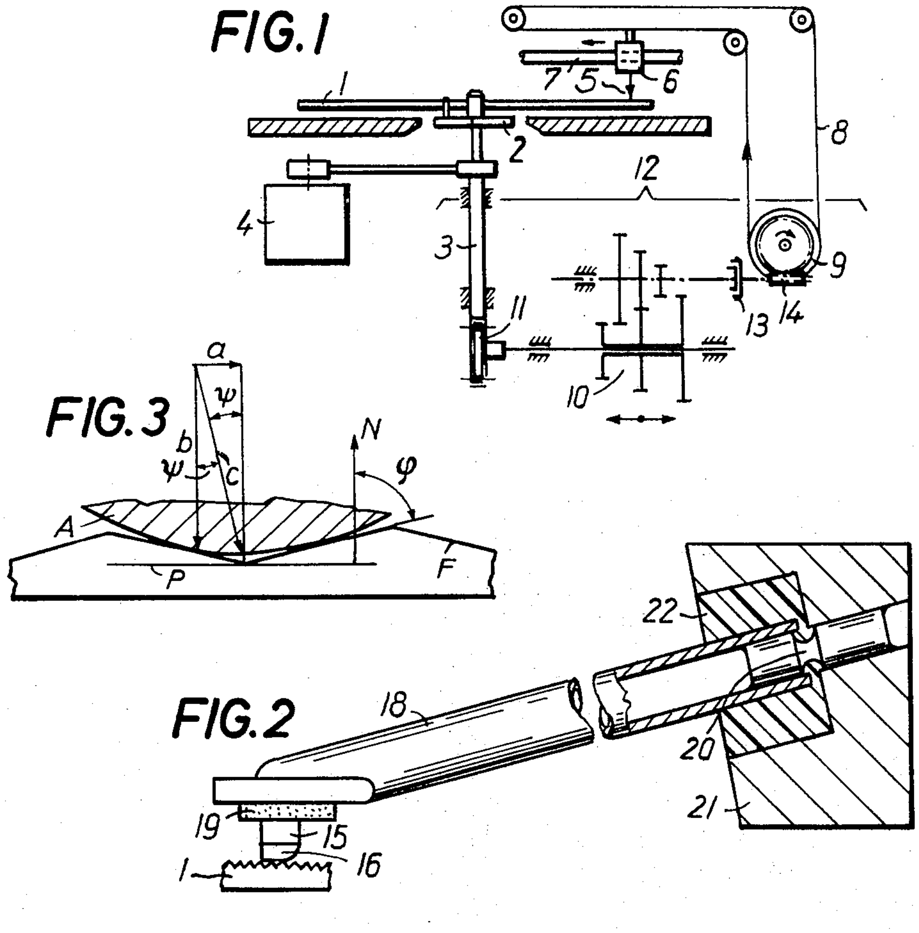
FIG. 1, FIG. 2, FIG. 3
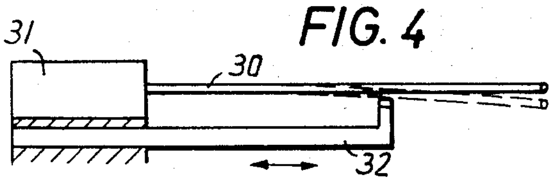
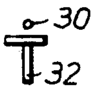
FIG. 4a
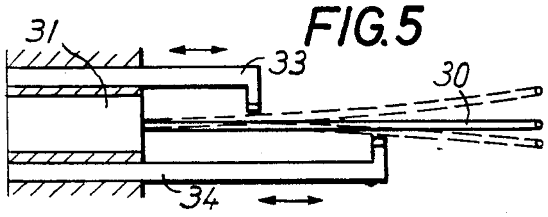
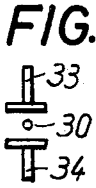
FIG. 5a
INVENTORS.
EDUARD SCHÜLLER
GERHARD DICKOPP
WOLFGANG RAINER
HORST REDLICH
HANS-JOACHIM KLEMP
BY Spencer & Kaye
ATTORNEYS.

POSITIVELY GUIDED DISC RECORD PICKUP

BACKGROUND OF THE INVENTION

The present invention relates to devices for playing back record discs carrying recorded video signals, and particularly mechanisms for guiding the disc playback head.

It is known to record images, particularly those constituting a television picture, in the grooves of a disc.

The conventional mechanisms for playing back records containing audio recordings, i.e., phonograph records, can not be directly used for playing back records containing very densely recorded signals, e.g. video recordings or picture records.

The differences between the conventional phonograph records and video, or picture, records are, inter alia, that much shorter spatial wavelengths ($1\ \mu - 3\ \mu$) as well as higher playback speeds (up to 16 m/sec) are used for video recordings. Contrary to audio recordings it is also advisable to record video signals by frequency modulation, i.e., to produce a spatial recording composed of a train of undulations having an almost constant amplitude. Due to relatively shallow configuration of the grooves and the large size, in the direction of movement, of the pickup compared to the recorded wavelength, care must be taken to maintain the pickup in good contact with the groove and with orientation always exactly tangential thereto.

SUMMARY OF THE INVENTION

It is a primary object of the invention to improve the playback of video record discs.

Another object of the invention is to improve the tracking of the grooves of such discs by the playback head.

A further object of the invention is to maintain optimum orientation of the playback head relative to the groove portion with which it is in contact.

These and other objects are accomplished according to the present invention by the provision of a positive guide means which moves the pickup for the video signals radially across the disc.

It is known in the production of carrier discs containing the signal recordings in grooves, to use positive guidance for the recording of the signals. When the same carrier is also used for playback on the same instrument on which the recording was made, the positive guidance is sometimes maintained although the groove guidance would be sufficient.

In magnetic sound dictating instruments using disc-shaped grooveless records it is also known to provide positive guidance during recording and playback.

In picture record players, which use picture records containing video signals recorded in grooves, positive radial guidance of the pickup is not known. However, it has been found that such guidance, particularly when employed in conjunction with further structural features which will be discussed in detail below, permits the achievement of special types of scanning which have not as yet been employed in sound recordings and playback.

The positive guidance according to the invention is effected, for example, by a gear drive, e.g. toothed gear, worm gear or friction gear, coupled with the drive shaft of the turntable to furnish the forward movement for the mount of the pickup. This assures that the pickup is advanced radially inwardly in proportion with the rotation of the turntable. The gear ratios are here so selected that the radial inward movement of the pickup corresponds to that of the cutting device employed for making the original recording, which device cuts, for example, 80 or 120 grooves/mm. Groove spacing errors, radial record wobble and other inaccuracies are caused to be automatically compensated by mounting the pickup elastically in its positively driven mount, e.g. by fastening it via a resilient and/or resiliently mounted tube.

A rigid coupling is provided between the guide means for the mount and the turntable drive to assure that the forward movement of the pickup corresponds to the path it travels in the spiral-shaped groove, independently of whether the record rotates slowly or fast.

The positive guidance may also be used for variable rotary speed drives, e.g. those providing a constant linear playback speed at the point of stylus contact, as well as for those having a constant rotational speed.

BRIEF DESCRIPTION OF THE DRAWINGS

FIG. 1 is a partly schematic, partly pictorial view of a basic arrangement employing the principle of positive guidance according to the invention.

FIG. 2 is an elevational detail view, partly in cross section, of an embodiment of a resilient mounting of the pickup in its positively guided mount according to the invention.

FIG. 3 is a detail view illustrating the mathematical relationships involved in the practice of the present invention.

FIGS. 4 and 5 are plan views of abutments for changing the spring constant of the elastic pickup mount.

FIGS. *4a* and *5a* are end views of the arrangements of FIGS. 4 and 5, respectively.

DESCRIPTION OF THE PREFERRED EMBODIMENTS

In FIG. 1 a picture record disc 1 is mounted on a turntable 2 having a vertical drive shaft 3 arranged to be driven by a drive motor 4. A pickup 5 is elastically mounted in a positively guided carriage 6 constituting the pickup mount. The carriage 6 is moved across the picture record 1 on a slide rail 7 by means of a rope pulley 8 in such a manner that the pickup 5 moves in a radial direction.

The rope pulley 8 is driven by a rope disc 9 which is driven in turn by a drive train composed of a worm gear 14, a set of gears 10 and a drive member 11 constituted by a toothed wheel or a worm gear, for example, driven by the turntable drive shaft 3. Gear set 10 can be adjusted to provide any one of several gear ratios to permit a selection of the relationship between the rate of disc rotation and the rate of carriage advance. The entire forward movement drive is designated 12. Between rope disc 9 and drive member 11 a coupling, or clutch 13 is provided to permit decoupling of the forward movement drive in order to produce certain effects which will be discussed below.

FIG. 2 shows the pickup, which consists of a piezoceramic transducer 15 and a skid-shaped stylus 16 fastened thereto, the stylus being of a very hard material, e.g. diamond, supported in a resilient mounting in the carriage. Between the supporting tube 18 and the transducer body 15 of the pickup an elastic intermediate layer 19 is provided. The tube 18 is fastened to the positively guided carriage 21 via a yieldable connector 20, e.g. of plastic. A buffer 22 disposed in carriage 21 to be in contact with tube 18 furnishes an additional spring force and effects the required vibration damping.

The buffer 22 may be a cureing silicone rubber material. The layer 19 may be a molded piece of a soft fluor elastomer, e.g. "Viton" of the "E.J. Dupont De Nemours Corporation." The yieldable connector may be a polyamid (nylon) fibre.

A particular novel effect is obtained when the positive coupling provided by clutch 13 between the turntable drive and the pickup carriage is eliminated by, for example, disengagement of this coupling. The pickup carriage then ceases to move due to the elimination of the positive drive. However, the pickup stylus is carried along in the groove for several disc revolutions because of the guidance provided by the groove and against the resistance of the elastic suspension 20, 22. The still rotating disc carries the pickup along in the groove until the spring force of its suspension returns it, i.e., it jumps back a few grooves. The process: deflection due to groove tracking — return jump because of spring force of the suspension, is repeated so that the information recorded on the portion of the groove over which this action takes place is repeated.

When the records are cut in such a manner that each groove contains half of a picture frame, or a whole number multiple thereof per revolution, the information in adjacent grooves varies only very little. The synchronization pattern, i.e., the horizontal and vertical pulses, does not change. If only a few grooves are repeated, the picture seems to be standing still from the moment when the advance movement of the pickup carriage is halted. If the repetition extends over many grooves, certain sequences of movement are continuously repeated. Such a playback possibility is of great significance for studies of motion of all types, for educational purposes and the like.

Further effects which are advantageous for picture reproduction can be realized when the advance movement is not only stopped, as described above, but is accelerated or delayed with respect to the normal speed. With a simple change in the relation between the rate of turntable rotation and the rate of pickup carriage advance during operation, a fast motion or a slow motion effect can be obtained. In this case, the accompanying sound must be turned off.

If the gear set is shifted to reduce the rate of advance of the carriage 6, 20 or 31, the result is that the carriage moves at a rate lower than that required to track the spiral groove on the disc. As a result, the stylus will alternately be carried forward by the groove it is tracking and jump back, creating a net slow motion effect. In the embodiment of FIGS. 5 and 5*a*, the amount of forward tracking movement is determined by abutment 34.

Similarly, when the gear set is shifted to increase the rate of carriage advance, the stylus alternately tracks the record groove while the carriage moves forward faster than the stylus and then jumps forward, creating an accelerated motion effect. In the embodiment of FIGS. 5 and 5a, the amount of tracking movement before each forward jump is determined by abutment 33.

The number of grooves repeated when carriage advance is halted or is greater or less than normal substantially depends on the spring constant of the elastic mounting 20, 22 and the pickup mounting 19, on the contact pressure of the pickup, on the angle formed by the groove sides with the plane of the record and on the pitch of the grooves. These relationships will be explained in detail with reference to FIG. 3. In this figure, A is the pickup skid. It is pressed against each groove side F with a force c, the groove side F forming an angle $\phi$ with the normal N on the plane P of the record. The force $c$ is composed of the retracting force a of the resilient pickup mount, i.e., the force tending to hold the pickup stationary, and the contact pressure force $b$. Force $c$ forms an angle $\psi$ with the record normal N and, accordingly, the angle $(\phi + \psi)$ with the groove side F.

If, as force a continues to increase, the angle $(\phi+\psi)$ becomes greater than 90°, the pickup jumps back toward the outside of the record. As long as $(\phi+\psi) < 90°$, the pickup remains in the groove and is pulled inwardly as it moves along the groove spiral, so that a thus increases and consequently so does $\psi$.

If, because of an increase in force a $$(\phi+\psi) > 90°$$

the pickup moves up the groove side and jumps back.

According to FIG. 3: $tg\ \psi = a/b$ thus $\psi = \text{arctg}\ a/b$

The condition for jumping back is:

$$(\phi+\psi) = \phi + \text{arctag}\ a/b > 90°$$

$\text{arctg}\ a/b > 90° - \phi$ $a/b > tg\ (90° - \phi) = ctg\ \phi$ $a\ b \cdot ctg\ \phi$ In the following numerical example it is assumed that the contact force is $$b = 0.2\ p\ \text{(pond)}$$

$\phi = 75°$

The retracting force for the pickup mount is assumed to be 0.3 $p$/mm.

According to the above equation:

$$a \geqslant b \cdot ctg\ \phi,$$

when the pickup jumps back $$a \geqslant 0.2 \cdot 0.27 = 0.054 p.$$

In the borderline case $a = 0{,}054\ p$ the deflection $x$ is $$x = 0.054/0.3 = 0.18\ \text{mm}.$$

For 120 grooves/mm, 22 grooves are thus jumped. Experience has shown that quite satisfactory results can be obtained when the pickup is resiliently mounted in such a manner and the other elements which influence the deflection, such as contact pressure of the pickup, shape of the grooves and groove pitch, are so selected that at least 10, and preferably 25 to 100, grooves are jumped.

Probably it is because of momentum that not only one groove is jumped. Further the pickup is accelerated not only in horizontal but also in vertical direction when leaving the groove. Thus some short time passes until the pickup returns to the plain of the grooves. In this short time there is no friction acting upon the pickup, whereas the friction is relatively great in the direction transverse to the groove during the pickup slides in the groove (the conditions being similar to this to be found at a sliding skate where the force to overcome the friction transverse to its track is essentially greater than parallel to the track). Thus the pickup mounted by means of a spring-like mounting will jump over several grooves if once drawn away from its track.

If in a given system composed of a particular pickup and record, the contact pressure *b* is increased, the pickup must be deflected further before it jumps back. The variation of the contact pressure is thus a means for changing the length of the repeated section.

The selection of the spring constant in the pickup suspension is a further means to bring the duration of the repeated portion to a certain value. The arrangement can also be constructed in such a manner that the spring constants can be given various settings. Embodiments for this are shown in FIGS. 4, 4*a*, 5 and 5*a*.

FIGS. 4 and 5 are plan views of the tube 30 which bends in the plain of the drawing if the rate of carriage advance is different from the rate required to track the spiral groove on the disc. The plain of the disc is parallel to the plain of the drawings.

In FIGS. 4 and 4*a*, a resilient supporting tube 30 for the pickup is resiliently supported by positively guided mount 31, which also carries an adjustable abutment 32 for determining the effective spring constant. The abutment may be moved in both directions parallel to the longitudinal axis of tube 30, as indicated by the double arrow in FIG. 4. For small lateral movements of the pickup, the abutment does not come into play. However, if the forward movement of the mount 31 is stopped and the pickup is carried along by the groove, it comes to abut against the right-angled end of abutment 32. The effective spring constant of the pickup mounting is thus substantially increased and is now determined substantially by the resiliency of the reduced free forward length of the supporting tube 30. The pickup thus jumps back earlier than it would if the abutment were not present.

In the arrangement shown in FIGS. 5 and 5*a*, there are provided two abutments 33 and 34 which can be moved in both directions parallel to the axis of tube 30. This is of particular importance in systems employing a set of gears for selctively changing the speed of the pickup advance movement. With the adjustable abutments 33 and 34 the repetition times for fast motion and slow motion can thus be set independently of one another, abutment 33 being effective during fast motion and abutment 34 being effective during slow motion.

The abutments shown in FIGS. 4 and 5 may themselves be resilient elements so that a further combined spring characteristic results. This provides the possibility of making the retracting forces of the tube 30 in combination with the abutments different in the horizontal and vertical directions, which occurs since the resistance moments of the tube 30 in combination with the abutments are different in the vertical and horizontal directions as far as the tube touches one of the abutments. It is desirable for the horizontal retracting force (parallel to the plane of the disc) to be increased by the abutment while the vertical retracting force (vertical to the plane of the disc) is to remain unchanged. Thus, in the embodiments of FIGS. 4 and 5, tube 30 can slide vertically (related to the plane of the record disc, which is parallel to the plane of the drawing) on abutments 32 or 33 and 34 nearly without friction so as to maintain the vertical retracting force applied to the stylus constant.

The abutment may be made of a flat material, for example. In order to overcome any resting influence of friction between the tube 30 and the abutments during vertical movement of the tube, the abutment made of flat material preferably has placed vertically its plane defining its small cross-sectional area and placed horizontally (i.e., parallel to the plane of the disc as shown in FIGS. 4*a* and 5*a*) its plane defining its larger cross-sectional area.

The set of gears for changing the speed of forward movement may be very simply constructed. It may be a step-type or infinitely variable gear mechanism. With a coupling, which must be provided anyway for the return of the pickup, the gears can be switched off and thus the pickup forward movement ceases.

It will be understood that the above description of the present invention is susceptible to various modifications, changes and adaptations, and the same are intended to be comprehended within the meaning and range of equivalents of the appended claims.

We claim:

1. In a system for playing back video signals recorded in the spiral groove of a record disc and including rotation means for rotating the disc, a stylus arranged to engage in the groove and a mount supporting the stylus, the improvement comprising:

resilient fastening means fastening said stylus yieldably to said mount;

drive means connected for normally driving said mount radially of the disc at a rate bearing a fixed relation to the rate of disc rotation and equal to the rate of radial movement experienced by said stylus while faithfully tracking the spiral grooves of the disc; and drive speed varying means connected to said drive means for selectively changing the rate of radial movement of said mount to a value different from that required for said stylus to faithfully track the spiral groove of the disc while continuing playback and maintaining said stylus in engagement with the groove, whereupon said stylus alternately faithfully tracks a plurality of groove turns and jumps radially across a plurality of groove turns.

2. An arrangement as defined in claim 1 wherein said drive means include a coupling device for disconnecting said drive means from said mount.

3. An arrangement as defined in claim 1 wherein said stylus is arranged to exert an adjustable contact pressure on the record disc.

4. An arrangement as defined in claim 1 further comprising a transducer rigidly connected to said stylus and resiliently connected to said fastening means.

5. An arrangement as defined in claim 1 wherein the signals recorded in the disc groove include synchronizing pulses, with similar synchronizing pulses being recorded in radial alignment in adjacent groove turns.

6. An arrangement as defined in claim 1 wherein said drive means and said speed varying means comprises a gear set coupling said mount to the means for rotating the disc.

7. An arrangement as defined in claim 6 wherein said gear set has a selectively variable gear ratio for permitting a video picture to be played back at faster and slower than real speed during which playback the sound accompanying the video signal may be switched off.

8. An arrangement as defined in claim 1 wherein said mount comprises a carriage and said resilient fastening means comprises a tube fastened in said carriage and supporting said stylus.

9. An arrangement as defined in claim 8 wherein said resilient fastening means further comprises a resilient connector connecting said tube to said carriage.

10. An arrangement as defined in claim 9 wherein said mount further comprises an elastic damping buffer disposed in said carriage and surrounding the end of said tube which is connected to said carriage.

11. An arrangement as defined in claim 1 wherein said drive speed varying means include a coupling device for disconnecting said drive means from said mount, whereupon said rate of radial movement of said mount has a value of zero and during rotation of the disc said stylus is carried along by the groove for several groove widths and then jumps back by several groove widths, due to the elasticity of the mounting of said stylus in said mount.

12. An arrangement as defined in claim 11 wherein said stylus is mounted in said mount to jump across a span of at least 22 groove widths when said drive means are disconnected.

13. An arrangement as defined in claim 11 wherein said stylus is mounted in said mount, and the relation between said stylus and the record groove are such that when said drive means are disconnected and the record rotates, said stylus will jump over at least 10 groove widths.

14. An arrangement as defined in claim 13 wherein said stylus will jump over a span of 25 to 100 groove widths.

15. In a system for playing back video signals recorded in the spiral groove of a record disc and including rotation means for rotating the disc, a stylus arranged to engage in the groove and a mount supporting the stylus, the improvement comprising resilient fastening means fastening said stylus yieldably to said mount, and means for selectively varying the spring constant of said resilient fastening means.

16. An arrangement as defined in claim 15 further comprising drive means connected for positively driving said mount radially across the disc, the drive produced by said drive means being directly derived from the rotation produced by the rotation means.

17. An arrangement as defined in claim 15 wherein said mount comprises a carriage and said fastening means comprises a tube fastened in said carriage and supporting said stylus.

18. An arrangement as defined in claim 17 wherein said means for selectively varying comprise an abutment fastened to said mount and disposed parallel to said tube for varying such spring constant, said abutment being displaceable in longitudinal direction, and being disposed so that said tube will bear against said abutment after it has reached a certain deflection relative to said carriage.

19. An arrangement as defined in claim 18 wherein there are a plurality of displaceable abutments.

20. An arrangement as defined in claim 19 wherein said abutments are arranged to be displaced individually.

21. An arrangement as defined in claim 18 wherein said abutments are constituted by resilient elements.

22. An arrangement as defined in claim 21 wherein the resistance moments of each said resilient element is different in a vertical direction from that in a horizontal direction.

23. An arrangement as defined in claim 22 wherein each said abutment in the form of a resilient element is composed of a flat material and arranged so that its larger cross-sectional area lies in a horizontal direction.

* * * * *